Oct. 9, 1934.  P. S. MORGAN  1,976,407
VERNIER FOR METER RECORDING MECHANISM
Original Filed Feb. 6, 1932  2 Sheets-Sheet 1

INVENTOR
PORTER S. MORGAN
BY
*Albert R. Henry*
ATTORNEY

Oct. 9, 1934.     P. S. MORGAN     1,976,407
VERNIER FOR METER RECORDING MECHANISM
Original Filed Feb. 6, 1932    2 Sheets-Sheet 2
FIG. 3.
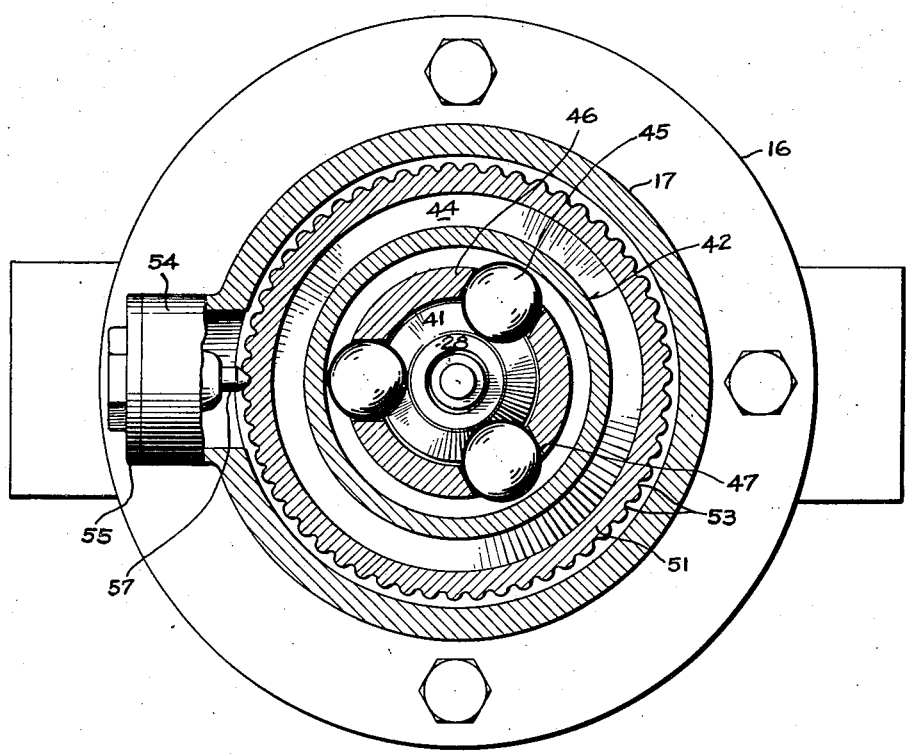
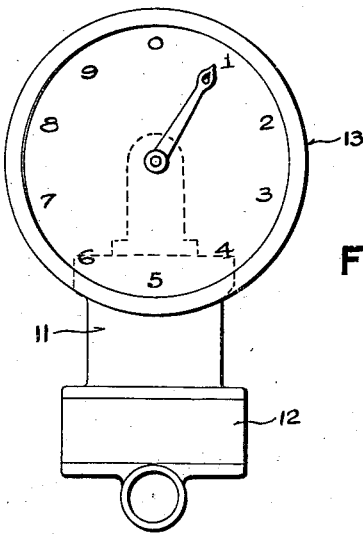
FIG. 2.
INVENTOR
PORTER S. MORGAN
BY *Albert R. Henry*
ATTORNEY Patented Oct. 9, 1934

1,976,407

UNITED STATES PATENT OFFICE 1,976,407

VERNIER FOR METER RECORDING MECHANISM

Porter S. Morgan, Norwalk, Conn., assignor, by mesne assignments, to Liberty Share Corporation, Buffalo, N. Y., a corporation of New York Application February 6, 1932, Serial No. 591,322
Renewed February 23, 1934

5 Claims. (Cl. 74—281)

This invention relates to registering meters, and it has particular reference to a vernier or calibrating means adapted to be interposed between the moving parts of a fluid operated device and indicating mechanism therefor, to effect an accurate reflection in the indicator of the operation of the device.

It is customary to measure fluids in motion by means of a metering device, including a moving part operated by the fluid, which moving part in turn is made to operate a registering element. The interconnection of the fluid operated device and the register has been heretofore obtained by means of gears or the like, so selected and dimensioned as to cause a predetermined movement of the fluid operated device to effect a proportional movement of the register. It has been found, however, that the provision of the connecting gears invariably introduces some error, since wear on the metering parts, inaccuracies of gear dimensions, changes in service conditions, and the like, destroy the ratio sought for. Accordingly, it has been customary to provide metering devices with a number of sets of gears, which could be interchanged as conditions required. It is apparent, however, that this expediency involves the supplying of an excessive number of parts and the expenditure of undue time and effort, and that the remedy is, at best, but temporary in its effect and uncertain in its result.

According to the present invention, the necessity of a plurality of independent sets of gears is dispensed with, and a driving connection, adjustable readily and with a high degree of accuracy, in the manner of a vernier, is provided for interposition between the fluid operated device and its registering mechanism. As herein expressly described, the invention takes the form of a cone clutch or drive, adjustable in small increments either to increase or decrease the ratio between the relative rotations of the meter and the recorder, so that any variations indicated in such ratio during service conditions may be readily and accurately effected, and without dismantling the apparatus or disconnecting it from service.

A typical example of the principles of the invention is hereinafter described with reference to the accompanying drawings, wherein:

Fig. 2 is a side elevation of the device, as applied to a metering mechanism.

Fig. 3 is a section on the line 3—3 of Fig. 1.

Figure 1:
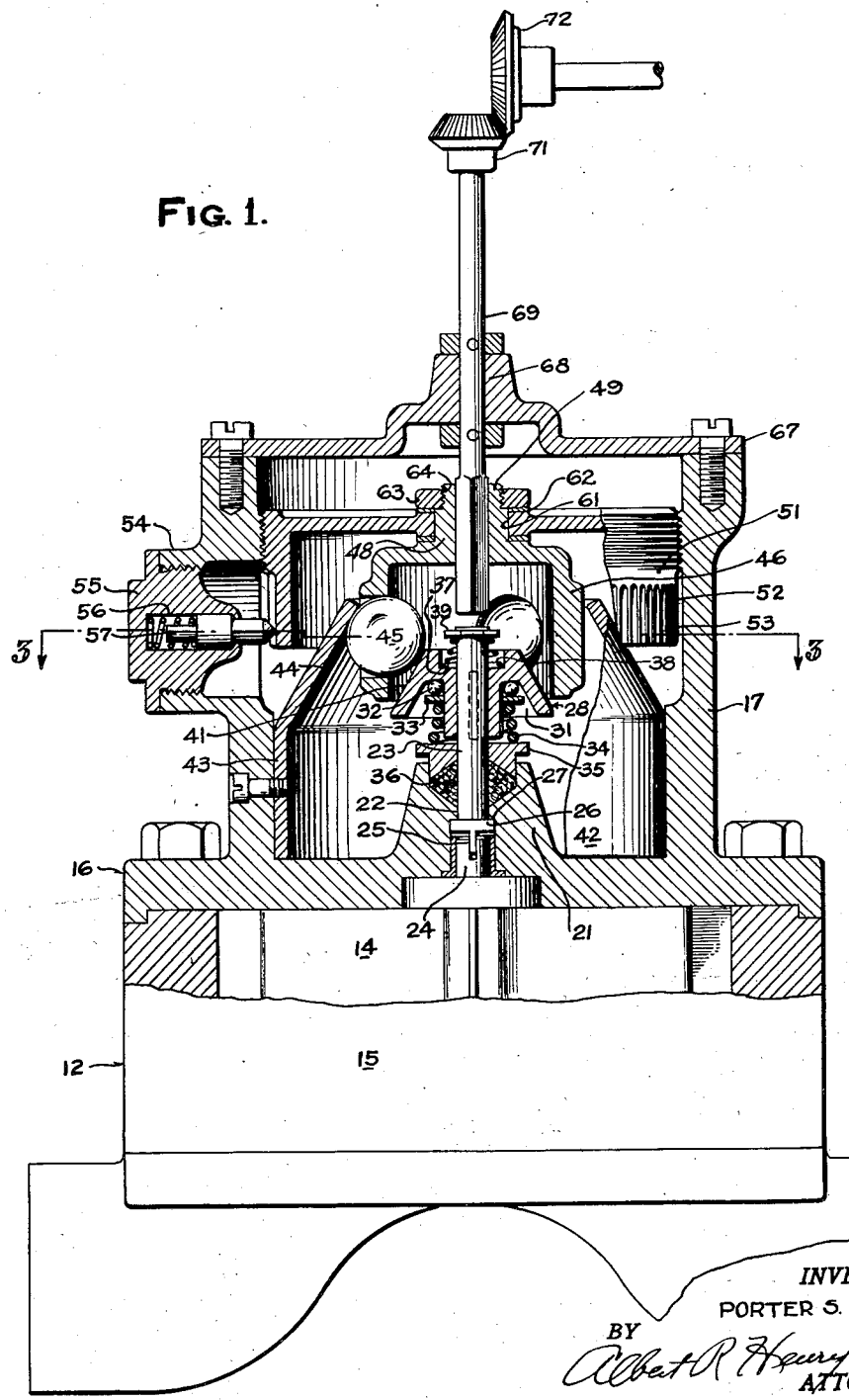
Fig. 1 is a vertical section through the device with portions of the adjusting nut and race member shown in elevation.

As illustrated in Fig. 2 of the drawings, the calibrating transmission device, indicated by the numeral 11, comprises a driving connection interposed between a fluid operated device 12 or like driving instrumentality and a rotation registering device 13 adapted to indicate the quantity of fluid passing through the device. For exemplary purposes the device 12 is shown as of the type disclosed in my co-pending application Serial No. 615,166 filed June 3, 1932, wherein a rotor 14 (Fig. 1) is enclosed by a housing 15 provided with suitable inlet and outlet ports, so that the fluid passes through the housing to effect the movement of the rotor.

In the present invention, the upper head 16 of the device 12 is formed with a cylindrical extension 17 providing a mounting body for the calibrating device 11.

A hub 21 formed on the central portion of the head 16, is axially bored to provide a bearing 22 for a rotatable stub shaft 23, which is connected to the shaft 24 of the rotor 14 by a tongue and slot connection, indicated by the numeral 25, so that the two shafts are substantially continuous. Upward movement of the stub shaft is prevented by forming therein a flange 26, adapted to engage a shoulder 27 formed in the hub 21 adjacent the bearing 22.

A driving cone 28, keyed to and mounted for sliding axial movement on the shaft 23, is formed with a circular recess 31, serving as a race for a plurality of ball bearings 32, which are retained therein by a washer 33 and a compression spring 34, disposed between the washer 33 and a thrust member 35 which is in contact with a packing 36, located in the hub 21. The spring 34 thus imparts an upward thrust on the driving cone 28 and also compresses the packing 36 about shaft 23 to provide a fluid tight joint. A seat 37 is formed in the upper portion of the cone 28, to receive a small spring 38, which engages a washer 39 secured to the upper end of the shaft 23. The spring 38 reacts against the cone 28 to impart a lifting action on the stub shaft 23, thereby assuring contact of the shaft flange 26 with the shoulder 27, and providing an additional preventative against fluid entry into the mounting body 17. The spring 38, of course, tends to oppose the action of the spring 34, but, because of its load characteristics, it is adapted to be compressed by the heavier spring 34 without affecting the action.

The outer frusto-conical face 41 of the cone 28 is finished to provide a race ring complementary to a stationary race member 42, formed with a cylindrical lower portion 43 adapted to fit within and be secured to the cylindrical body 17, and with an upper inwardly tapered portion 44. A plurality of driving balls 45, positioned in a cage 46, are interposed between the races 41 and 42, and are retained in contact therewith by the urge of the spring 38 on the cone 28, so that, upon the rotation of the cone, the balls 45 and the cage 46 are also caused to revolve. The cage 46 is formed generally as a cylindrical member provided with a plurality of radially arranged cylindrical apertures 47, serving as receiving pockets for the balls 45, and it is further formed with a top or end portion 48 provided with an upwardly extending cylindrical hub 49, by means of which, in part, the relative positions of the cage 46 and race members may be varied.

The means for effecting the axial or vertical adjustment of the cage 46, to bring the balls 45 into any desired plane of planetary movement, comprise a nut 51 formed with external threads engaging internally formed threads disposed in the upper portion of the cylinder 17. The nut 51 is further provided with a depending cylindrical portion 52 which is longitudinally scored about its periphery to form grooves 53, into which a securing pin or adjusting tool may be inserted. In order to reach the grooves 53, the cylinder 17 is formed adjacent the portion 52 with a laterally extending hollow boss 54, normally closed by a threaded cap nut 55 which is internally recessed, as indicated by the numeral 56, to receive a spring pressed and shouldered pin 57. It will thus be seen that, when the nut 55 is removed, a tool may be inserted through the boss 54, to effect the rotation of the adjusting nut 51 in either direction, and, when the nut 55 is replaced in the boss, the pin 57 enters one of the grooves 53, to prevent further movement.

The adjusting nut 51 is centrally drilled to provide a radial bearing 61 adapted to receive the hub 49 of the cage 46. Thrust washers 62 are mounted on the hub in contact with each face of the nut 51, and a retaining nut 63 is applied to the threaded portion 64 of the hub 49 to maintain the bearing in its assembled condition. It will now be observed that while the cage 46 is free to rotate within the nut 51, adjustment of the nut changes the position of the cage relative to the race members 41 and 42.

The upper end of the cylinder 17 is closed by means of a cap plate 67 which is centrally provided with a bearing 68 for a driven shaft 69. The lower end of the driven shaft is of square or non-circular cross section, and is adapted to fit within a bore of like section, formed axially in the hub 49 of the cage 46. The upper or exposed end of the shaft 69 may terminate in a bevel gear 71, meshing with a gear 72 forming a part of the registering mechanism 13, shown in Fig. 2.

In operation, passage of fluid through the fluid operated device 12 causes the rotation of the rotor 14, stub shaft 23, and cone 28, and, since the drive balls 45 are firmly pressed between the races 41 and 42 by the action of the spring 34, the rotational motion imparted to the cone is transmitted to the balls 45, thus causing a rotation of the cage 46 and resulting in the operation of the mechanism of the register 13. In order that the registering device may faithfully indicate the amount of liquid passing through the meter, however, a certain ratio must be established between the revolutions of the stub shaft 23 and the shaft 69, driven through the balls 45, and operating the registering elements. This ratio may be approximately reached by proper selection of the various gears involved, but is not readily made absolute, since various errors in dimensioning of the parts, the hydraulic conditions encountered, and the wear and tear, intervene to destroy the ratio sought for. It will be apparent, however, that with the apparatus herein provided, the ratio between the relative number of revolutions of the shafts 23 and 69 may be varied, in much the same fashion as may be effected between two shafts interconnected by means of cone pulleys.

When the adjusting nut 51 is operated to lower the cage 46, the annular flange thereof clears both the cone 28 and the race member 42, while the balls 45 are moved outwardly in their pockets 47 under the cam influence of the parallel faces 41 and 42, thereby increasing the diameter of the pitch circle. During this movement the spaced relation between the cone 28 and the race member 42 remains fixed by the spacing effect of the balls. The fact that the race member 42 is rigidly mounted insures the accurate movement of the balls, and also provides a centering means for the cone 28 and stub shaft 23 to prevent the imposition of undue stress on the parts.

It will be obvious that numerous variations of the described structure may be made without departing from the spirit of the invention, for example, the frusto-conical form of parallel faces 41 and 42 may be varied to be suitably curved, thus providing a changed characteristic curve for the adjusting means. The scope of the invention should be determined, therefore, by reference to the following claims.

I claim:

1. In a change speed friction drive mechanism, a drive shaft, a driven shaft axially aligned with said drive shaft, a mounting body for receiving said shafts, a cone mounted on one of said shafts and having a conical face, a race member fixedly mounted on said body and having an internal face spaced from the conical face of said cone, a plurality of balls between said faces, a ball cage mounted on the remaining shaft and provided with radiating cylindrical pockets for receiving said balls, and means mounted on said body for adjusting said cage axially relative to said shafts.

2. In a change speed friction drive mechanism, a drive shaft, a driven shaft axially aligned with said drive shaft, a mounting body for receiving said shafts, a cone member mounted on the drive shaft and having a conical face, a race member fixedly mounted on the body and having an internal circular face parallel to the conical face of said cone member, a plurality of balls between said faces, means engaging one of said members for resiliently retaining said faces in contact with the balls, a ball cage mounted on the driven shaft and provided with pockets for rotatably receiving each ball, and means mounted on said body for adjusting said cage axially relative to said shafts.

3. In a change speed friction drive mechanism, a drive shaft, a driven shaft axially aligned with said drive shaft, a mounting body for receiving said shafts, a cone member keyed to said drive shaft and adapted for axial sliding movement thereon, said cone member having a conical face, a race member fixedly mounted in said body and having an internal circular face parallel to the conical face of said cone member, a plurality of balls between said faces, resilient means engaging said cone member to retain it in contact with said balls, a cage member formed with radial guiding means for said balls, means on the body for adjusting said cage axially relative to said shafts, and a driving connection between said cage and said driven shaft.

4. In a change speed friction drive mechanism, a drive shaft, a driven shaft axially aligned with said drive shaft, a mounting body for receiving said shafts, a cone member mounted on one of said shafts and having a conical face, a race member fixedly mounted on the body and having a circular face parallel to the conical face of the cone member, a plurality of balls between the faces, a cage member mounted on the driven shaft and formed with radial guiding means for said balls, an adjustable nut in the body having a bearing connection with said cage, said nut being adjustably mounted in said body for axial movement relative to said shafts, whereby said cage and accompanying balls may be moved axially, and means in said housing movable into locking engagement with said nut.

5. In a change speed friction drive mechanism, a drive shaft, a driven shaft axially aligned with said drive shaft, a mounting body for receiving said shafts, a cone member mounted on one of said shafts and having a conical face, a race member fixedly mounted on the body and having a circular face parallel to the conical face of the cone member, a plurality of balls between the faces, resilient means engaging said cone member to retain it in engagement with said balls, a cage member mounted on the driven shaft and formed with radial guiding means for said balls, an adjustable nut mounted in the body for axial movement relative to said shafts and formed with a central bearing portion, said cage being formed with a hub portion rotatably mounted in said bearing portion, and thrust bearing means on said nut for retaining said cage against axial movement relative thereto.

PORTER S. MORGAN.